United States Patent [19]

Anthony et al.

[11] Patent Number: 4,636,408

[45] Date of Patent: Jan. 13, 1987

[54] ULTRAVIOLET RADIATION STABILIZED POLYMER COMPOSITIONS

[75] Inventors: Blair T. Anthony; Daniel R. Olson, both of Schenectady, N.Y.

[73] Assignee: General Electric Company, Schenectady, N.Y.

[21] Appl. No.: 757,699

[22] Filed: Jul. 22, 1985

Related U.S. Application Data

[63] Continuation of Ser. No. 575,244, Jan. 30, 1984, abandoned.

[51] Int. Cl.[4] .......................... B05D 5/00; B05D 7/00; C08J 7/06
[52] U.S. Cl. ..................................... 427/160; 427/316; 427/384; 427/402; 428/543; 524/102
[58] Field of Search ................ 524/102; 427/160, 316, 427/384, 402

[56] References Cited

U.S. PATENT DOCUMENTS

| | | | |
|---|---|---|---|
| 4,315,848 | 2/1982 | Dexter | 524/102 |
| 4,322,455 | 3/1982 | Olson | 427/316 |
| 4,323,597 | 4/1982 | Olson | 427/160 |
| 4,382,109 | 5/1983 | Olson | 524/102 |
| 4,402,983 | 9/1983 | Craven | 524/102 |
| 4,404,257 | 9/1983 | Olson | 427/160 |
| 4,410,594 | 10/1983 | Olson | 427/160 |
| 4,413,075 | 11/1983 | Battista | 524/102 |
| 4,555,538 | 11/1985 | Shu | 524/102 |

Primary Examiner—C. Warren Ivy
Attorney, Agent, or Firm—James Magee, Jr.; James C. Davis, Jr.

[57] ABSTRACT

A process and composition for improving the ultraviolet radiation stability of articles made from resins subject to photo degradation by contacting the article at a selected temperature with a stabilizer composition comprising an ultraviolet radiation absorber and a hindered amine light stabilizer in a nonagressive liquid carrier.

5 Claims, No Drawings

ULTRAVIOLET RADIATION STABILIZED POLYMER COMPOSITIONS

This application is a continuation of application Ser. No. 575,244, filed Jan. 30, 1984, now abandoned.

This invention relates to the stabilization of resins, polymers, and articles thereof against ultraviolet radiation induced degradation; to stabilizing compositions which can be applied to the surface of a article made from ultraviolet radiation sensitive polymers; and to methods for achieving stabilization against ultraviolet radiation induced degradation of resins, polymers and articles formed therefrom, and to the stabilized articles themselves.

In a particular aspect this invention relates to polyphenylene ether resins and more particularly to polyphenylene ether resins and shaped articles thereof characterized by improved resistance to ultraviolet radiation induced degradation.

BACKGROUND OF THE INVENTION

Many organic polymeric materials, including polyphenylene ethers, undergo degradation when exposed to high energy photons of ultraviolet radiation. The degradation manifests itself, depending on the polymeric material, in yellowing, discoloration, embrittlement and other loss of physical properties. An object of this invention is to provide a method of producing a resin article which is highly resistant to ultraviolet light induced degradation.

The use of ultraviolet radiation absorbers with various resins such as polyesters, polyolefins, vinyls, and polystyrene to provide protection against attack by ultraviolet radiation is known in the art. The ultraviolet radiation absorber functions by reasons of its ability to screen out the damaging ultraviolet portion of light due to its very high absorptivity relative to that of the polymer. In order to qualify as a successful ultraviolet light absorber for a polymer, there are several requirements which the absorber must fulfill. The absorber must have a high specific absorptivity in the range of wave lengths which are most deleterious to the polymer that are present in the source of the exposure. The absorber must be compatible with the polymer and must not itself cause the loss of properties or an increase in color. The absorber must not significantly absorb in the visible region of the spectrum or a color will be imparted to the polymer to which it has been added. The absorber must also have a sufficiently low volatility to permit its continued residence in the polymer.

Several methods are known in the prior art utilizing these ultraviolet radiation absorbers to stabilize various polymers, against ultraviolet radiation. These methods include blending the ultraviolet radiation absorbers with the polymer prior to processing; incorporating the absorbers in surface laminating or coating materials which are applied onto the surface of the processed polymer; and impregnating the absorbers in the polymer surface. The surface impregnation techniques known in the prior art include (i) using aggressive solvents to swell or soften the polymer surface thereby allowing the absorber to diffuse into the softened surface of the polymer; (ii) melting the absorber and the polymer surface in order to diffuse the molten absorber into the molten polymer surface; and (iii) partitioning of the absorber between a polymeric surface and a relatively poor solvent for the absorber held at high temperatures whereby the absorber, which is more soluble in the polymer than in the solvent diffuses into the polymer surface.

Variant techniques for surface impregnation of polycarbonate resins are disclosed in U.S. Pat. Nos. 4,323,597 and 4,322,455.

While each of these methods can be utilized to impart improved ultraviolet stability to a polymer system, each of them has certain disadvantages. Blending the absorber with the bulk polymer results in the absorber being distributed throughout the entire polymer system. This procedure is both uneconomical, as these absorbers are usually quite expensive, and not completely successful. Since most of the absorber resides in the polymers interior instead of at the surface where it is most needed, much of the harmful ultraviolet radiation penetrates and deteriorates the surface of the polymer structure before reaching the majority of the absorber. Furthermore, since the concentration of the absorber in the resin is limited by the degree of compatibility of the absorber with the polymer, using sufficiently high concentrations of absorber effective to provide surface protection generally tends to adversely affect the physical properties of the polymer. Incorporating the absorbers in surface laminating or coating the materials suffers from the disadvantage of being generally difficult and expensive to use since an extra complicated processing step is required. Furthermore, difficulties are sometimes encountered in adhering the coating or laminating material to the surface of the polymer, or in maintaining continued adequate adhesion, especially after exposure to weathering. Even when the coating or laminating material adheres well, it often cannot be applied without forming unsightly streaks on the polymer surface. An additional drawback to this method is that often the physical properties of the polymer, such as impact strength, are adversely affected by these coating or laminating materials.

While, in principle, the surface impregnation techniques are the most desirable since the ultraviolet radiation absorbers are contained only in the surface regions of the polymer where they are needed, in practice the prior art surface impregnation techniques all suffer from certain disadvantages. Melting the polymer and the absorbers in order to diffuse the absorbers into the polymer surface is undesirable because the polymer, or at least the surface region, must be heated to the melting point. This may result in an uneven or wrinkled polymer surface being formed upon cooling and solidifying of the polymer. Furthermore, the physical properties of the polymer may sometimes be deleteriously affected by melting of the polymer. In the aggressive solvent technique an ultraviolet radiation absorbing compound is dissolved in a solvent which is aggressive towards the polymer. Typical aggressive solvents include chlorinated hydrocarbons, esters, or aromatic hydrocarbons. When these solutions are applied onto the surface of a resin article the aggressive solvent functions as a softening or swelling agent for the polymer surface allowing the absorber to diffuse into the softened or swelled polymer surface regions. However, the aggressive nature of these solvents causes problems. Surface imperfections can develop during exposure to the solvent. Contact between the polymer and the solvent can lead to etching, hazing and crazing of the polymer surface. Using ultraviolet radiation stabilizing solutions containing an ultraviolet radiation absorbing compound which is more soluble in the polymer than in the stabilizing solution sharply limits the number and type of ultraviolet radiation absorbing compounds which may be used. Also, a large volume of the stabilizing solution must be used. This requires the use of large amounts of ultraviolet radiation absorber.

Accordingly, it can be seen that there is a strong need for an economical and effective composition and method for imparting an improved degree of ultraviolet radiation resistance to a variety of polymer resins and articles including polyphenylene oxide polymers, acrylonitrile-butadiene-styrene copolymers, polystyrene polymers and related homo and heteropolymers.

In accordance with the present invention unexpectedly improved resistance to ultraviolet radiation induced degradation is achieved by impregnating the surface of a polymer resin article with a stabilizing composition comprising a radiation absorber, such as a benzophenone, and a hindered amine co-stabilizer, such as a hexahydro-piperidine derivative, in a liquid carrier which is not a solvent for the resin, i.e., a nonaggressive liquid carrier. The composition can be applied to the article or resin surface at ordinary temperatures, e.g., room temperature, and then heat applied to raise the surface temperature to a point at which the stabilizer components diffuse into the resin surface layers but below the point where the physical properties of the resin or article are substantially diminished. Alternatively, the stabilizer composition can be applied to the still-hot surface of a recently molded or extruded article.

In accordance with the present invention an article comprised of a resin, such as a polyphenylene ether resin, is formed in a conventional manner, for example, by injection molding, extrusion, cold forming, vacuum forming, blow molding, compression molding, transfer molding, and the like. The article may be in any shape and need not be a finished article of commerce, that is, it may be sheet material or film which would be cut or sized or mechanically shaped into a finished article. Therefore, as used herein, the term "article" refers to any shape or form of resin whether finished or stock material.

In the practice of the process of the instant invention a stabilizing composition containing the ultraviolet radiation absorber the amine co-stabilizer and the nonaggressive liquid carrier can be applied onto the hot or cold surface by any of several known methods such as spraying, flow coating, brushing, and the like. The article with the stabilizing composition on its surface is then heated to and kept at a temperature effective for the ultraviolet radiation absorber to diffuse into the surface layers of the resin. Heating at the effective temperature is continued and the stabilizing composition is kept in contact with the resin surface of the article, at the effective temperature, for a period of time sufficient for the ultraviolet radiation absorber to effectively impregnate the surface layers of the article, i.e., for the ultraviolet radiation absorber to diffuse throughout the surface layers of the resin article in concentrations sufficient to provide protection against the deleterious effects of ultraviolet radiation. Since the stabilizing composition is not a solvent for or reactive towards the resin there is no time limit beyond which the composition can remain in contact with the resin at the effective temperature. The upper time limit is govered by such secondary considerations as speed of processing of the article, rate of evaporation of the carrier, and the like. The minimum period of time that the stabilizing composition is kept in contact with the article at the effective temperature is that period of time which is sufficient for the stabilizers to impregnate the surface layers of the resin in concentrations effective to provide protection against degradation by ultraviolet radiation. This minimum period of time generally depends to some extent upon the particular ultraviolet radiation active stabilizer compounds present in the stabilizing composition, the particular liquid carrier used, and the temperature of the surface coated with the stabilizing composition. Generally the hot stabilizing composition and the hot resin article are kept in contact with each other from about 5 seconds to about 2 hours, preferably from about 30 seconds to about 30 minutes.

It is critical to the practice of the present process that the article with the stabilizing composition on its surface be at a temperature sufficiently high for the ultraviolet radiation absorber to impregnate the surface layers of the article in concentrations effective to provide protection against degradation of the resin by ultraviolet radiation. If the article having a layer of the stabilizing composition on its surface is not at a temperature effective for the impregnation of the absorber and the hindered amine co-stabilizer into the surface layers to take place the ultraviolet radiation absorber will not diffuse into or impregnate the surface layers of the resin and consequently, the resin will not be stabilized against ultraviolet radiation. Generally, the minimum temperature at which impregnation of the resin by the ultraviolet radiation absorber takes place is about 60° C. to 65° C. Preferably the article coated with the stabilizing composition is heated to at least about 75° C., as at this temperature and above the ultraviolet radiation absorbing compound and the hindered amine co-stabilizer generally diffuse rapidly and in large amounts into the surface layers of the resin. The maximum temperature is determined by the heat stability of the resin. Thus, the upper temperature limit is below the glass transition temperature of the resin. Preferably it should be below the temperature at which bubbles and other imperfections begin to appear in the resin.

When the article is contacted by the stabilizer-containing composition and subsequently heated, it is generally preferred that the temperature be kept below the heat distortion temperature of the resin. The particular temperature therefore is determined in part by the choice of resin and the general geometry of the article.

In the practice of the process of the instant invention a resin article having a coating layer of the stabilizing composition on its surface can be heated to an effective temperature of from between about 65° C. and about 90° C., preferably between 70° C. and 80° C. and maintained at this temperature for a period of time of from about 5 seconds to about 2 hours.

It will be appreciated that in various article-forming operations a hot extrudate is available for application of the stabilizer-containing composition and that the surface temperature frequently exceeds the heat distortion temperature of the resin. The stabilizer composition can be applied at any effective temperature which is below the decomposition temperature of the compounds themselves. Accordingly, it is contemplated that temperatures of 400° F. or above are effective temperatures for stabilization of resin articles in accordance with this invention.

The polymers or resins which can be stabilized against ultraviolet radiation induced degradation include polystyrene resins, acrylonitrile-butadiene-styrene resins, and polyphenylene ether resins. Of particular interest are polyphenylene ether resins and polyphenylene ether resin blends such as those described in U.S. Pat. Nos. 3,383,435 to E. P. Cizek and U.S. 4,128,602 to Katchman et al, both of which are incorporated herein by reference. Illustrative styrene and acrylonitrile-butadiene-styrene polymers are disclosed in Encyclopedia of Chemical Technology, Kirk-Othmer, Third Edition, John Wiley & Sons.

The sterically hindered amines which function as co-stabilizers which are useful in the practice of this invention are illustrated by alkyl substituted piperidinyl alkandioic acid esters such as bis(1,2,2,6,6-pentamethyl-4-piperidinyl)sebacate. The compounds can be characterized by the formula:

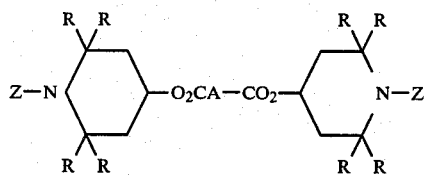

in which A is an alkanediyl i.e., a chain of methylene groups, having from 2 to 10 carbon atoms, derived from an alkane dioic acid such as succinic acid glutaric acid, adipic acid, sebacic acid and the like. R and Z can be the same or different lower alkyl groups of 1 to 3 carbons or, in the case of Z, hydrogen.

The amine co-stabilizers are not generally considered to be radiation absorbing compounds, i.e., which do not absorb radiation in the ultraviolet or visible regions of the spectrum, generally above about 290 nanometers. Although the precise mechanism by which they operate is not known, it is believed that energy quenching and antioxidant (peroxide decomposition and alkyl radical termination) mechanisms are involved.

Hindered amine compounds which are useful as co-stabilizers are believed to be reactive with hydroperoxides which can exist on the polymer surface forming stable radicals, such as nitroxyl radicals which are involved in the stabilization process have structures compatible with this mechanism. Referece is made to the article by K. B. Chakrabarty et al, Chemy. Ind. (London) 1978 at page 237 and U.S. Pat. No. 3,640,928 cited therein.

Additional hindered amine light stabilizers include 1,1'-(1,2-ethanediyl)bis(3,3,5,5-tetramethylpiperazinone); dimethyl succinate polymer with 4-hydroxy-2,2,6,6-tetramethyl-1-piperidineethanol (Ciba Geigy TINUVIN ®622); and a polymeric hindered amine available from Ciba Geigy under the name CHIMASSORB ®944 which is believed to have the structure

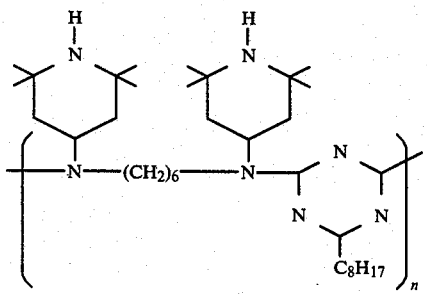

As a group of functionally equivalent compounds hindered amine light stabilizers, generally referred to as HALS, are recognized by those in polymer technology as an identifiable class. The presence of the poly-substitution at the 2 and 6 positions of a piperidine ring is believed to be a structural characteristic of these compounds. Accordingly, a preferred class of hindered amine light stabilizers for use as the co-stabilizer component of the multi or single component liquid compositions and of the surface impregnated articles of this invention are those which have at least one moiety of the following structure:

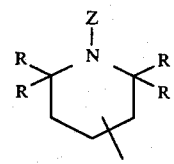

in which R and Z are as defined above.

The ultraviolet radiation absorbers employed in the practice of this invention can be any of the known ultraviolet radiation absorbing compounds which function by reason of their ability to screen out the damaging ultraviolet portion of light due to their very high absorptivity in this region of the spectrum. These compounds include benzophenone and the benzophenone derivatives, benzotriazole and benzotriazole derivatives, benzoate esters, phenyl salicylates, derivatives of crotonic acid, malonic acid esters, and cyanoacrylates.

Included among the ultraviolet radiation absorbers which fall into the categories of benzophenone derivatives and benzotriazole derivatives are those compounds disclosed in U.S. Pat. Nos. 3,309,220; 3,049,443 and U.S. Pat. No. Re. 2,976, all of which are incorporated herein by reference. Some non-limiting examples for these compounds include;

2,2'-dihydroxybenzophenone;
2,2'4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiary butylbenzophenone;

2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone;
2-(2'-hydroxy-5'-methylphenyl)-benzotriazole;
2-(2'-hydroxy-5'tert-butylphenyl)-benzotriazole;
2-(2'-hydroxy-3'-methyl-5'-ter-butylphenyl)-benzotriazole;
2-(2'-hydroxy-5'-cyclohexylphenyl)-benzotriazole;
2-(2'-hydroxy-3',5'-dimethylphenyl)-benzotriazole;
2-(2'-hydroxy-5'-tert-butylphenyl)-5-chloro-benzotriazole; and
2-(2'-hydroxy-3'-di-tert-butylphenyl)-benzotriazole.

Two non-limiting examples of the derivatives of crotonic acid which function as ultraviolet radiation absorbers are alpha-cyano-beta-(p-methoxyphenyl)-crotonic acid methyl ester and alpha-cyano-beta-N-(2-methyl-indolinyl)crotonic acid methyl ester. The benzoate ester ultraviolet radiation absorbing compounds include the $C_8C_{20}$ alkyl and aryl benzoates, alkyl and aryl hydroxybenzoates, alkaryl and arylkyl benzoates, and alkaryl and arylkyl hydroxybenzoates.

The malonic acid esters which are ultraviolet radiation absorbing compounds include the benzylidene malonates disclosed in U.S. Pat. No. 4,322,455, which is incorporated herein by reference.

The cyano-acrylates which are useful ultraviolet radiation absorbers are those cyano-acrylates disclosed in U.S. Pat. No. 4,129,667 which is incorporated herein by reference.

The preferred ultraviolet radiation absorbing compounds, for the purposes of the present process, are the benzophenones and benzophenone derivatives, benzotriazole and benzotriazole derivatives, the benzylidene malonates, and the cyano-acrylates.

The stabilizing composition contains at least one nonaggressive liquid carrier for the ultraviolet radiation absorber. This liquid carrier is nonagressive towards the resin, i.e., it does not attack the resin surface and does not cause the polymer to swell or soften. The stabilizing composition can contain one or more liquid carriers. If two or more liquid carriers are present in the stabilizing composition they must be miscible with each other. Examples of preferred nonaggressive liquid carriers include hydroxy ethers, alcohols, alcohol-water mixtures, liquid aliphatic hydrocarbons, liquid cycloaliphatic hydrocarbons, and chlorofluorocarbons such as those marketed by the E. I. duPont Company under the tradename Freon, e.g., dichlorodifluoromethane, trichlorofluoromethane, and the like. Generally, it is preferred that these liquid carriers be relatively volatile, i.e., that they volatilize at or below about 130° C.

The preferred alcohols are the aliphatic alcohols with the alkanols, particularly the $C_1$-$C_6$ alkanols, being preferred. Some nonlimiting examples of these $C_1$-$C_6$ alkanols include methanol, ethanol, propanol, isopropanol, tertiary butanol and the like.

The preferred liquid aliphatic and cycloaliphatic hydrocarbons are the liquid saturated aliphatic and cycloaliphatic hydrocarbons containing from 5 to about 20 carbon atoms. Some nonlimiting examples of these hydrocarbons include pentane, hexane, octane, nonane, decane, undecane, the various positional isomers of the foregoing cyclohexane, cyclopentane, cyclooctane, and the like.

The hydroxy-ethers which are useful as carriers in the stabilizing composition are compounds represented by the general formula

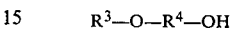

$$R^3-O-R^4-OH$$

where $R^3$ is an alkyl or an alkoxy alkyl radical containing from 1 to about 67 carbon atoms, and $R^4$ is a divalent saturated aliphatic hydrocarbon radical containing from 1 to about 67 carbon toms.

In the practice of the present invention the liquid carrier must not only be nonaggressive towards the resin, but should also wet the resin. Thus, for example, while water is generally nonaggressive towards a particular resin, it may not be an effective liquid carrier for the purposes of the present invention because it does not wet the resin.

The following Examples illustrate the principles and practice of the invention.

Examples 1–8 present a comparison of between the changes in yellowness index, as measured by a standard procedure, resulting from stabilization with certain named ultraviolet radiation absorbing agents (UVA) alone and these same compounds in the composition of the invention, i.e., in combination with a hindered amine light stabilizer (HALS). The results are summarized in Table I, below:

TABLE I

| Example | Type of Stabilizer(s) | ΔYI (168 hours) |
|---|---|---|
| Changes in Yellowness Indices During Exposure to RS Sunlamps of Untreated and Surface Impregnated ABS Samples | | |
| 1 | Cyanoacrylate UVA | 16.4 |
| 2 | Hydroxybenzophenone UVA | 15.4 |
| 3 | Benzotriazole UVA | 15.8 |
| 4 | Cyanoacrylate UVA + HALS | 5.7 |
| 5 | Hydroxybenzophenone UVA + HALS | 5.8 |
| 6 | Benzotriazole UVA + HALS | 11.2 |
| 7 | HALS | 28.6 |
| 8 | None | 27.5 |

In Example 1 a 4 inch square, 0.07 inch thick specimen of commercial ABS plastic sheet was flow coated with a solution containing 5 parts by weight of 2-ethylhexyl-2-cyano-3,3-diphenylacrylate marketed under the tradename Uvinul N-539 in 95 parts by weight of 2-butoxyethanol. The specimen was drained for about 1 minute, heated to about 95° C. and held at that temperature for about 30 minutes. The specimen was cooled and washed with isopropanol to remove any surface residue. The reflective index of the specimen was measured with a Gardner Instruments colorimeter, Model XL20, following ASTM procedure D-1925. The sample was then placed on a rotating table ten inches below an array of four sunlamps and exposed for a period of 168 hours, after which the yellowness index was again measured and the change (ΔYI) measured.

In Examples 2 and 3, the procedures of Example 1 were followed except that the cyanoacrylate UV absorber was replaced by 2-hydroxy-4-dodecyloxybenzophenone and 2(2-hydroxy-5-t-octylphenyl)benzotriazole respectively. In Examples 3-6, the procedures of Example 1 was followed except that the solution was prepared by combining one part of weight of the hindered amine light stabilizer (HALS) bis(2,2,6,6-tetramethyl-4-piperidinyl)sebacate, marked by Ciba Gegy as Tinuvin 770, with 100 parts by weight of the specific solution of Example 1. Thus Examples 4, 5, and 6 correspond to Examples 1, 2, and 3, except for the presence of the amine. Example 7 shows the effect of the amine alone and Example 8 is an unstabilized control.

In Examples 9 through 16, the procedures of Example 1-8 were followed, except that the specimens were 4×4×0.03 inch sheets of commercial polystyrene. The results are set forth in Table II below.

TABLE II

Change in Yellowness Indices During Exposure to RS Sunlamps of Untreated and Surface Impregnated Polystyrene Samples.

| Example | Type of Stabilizer(s) | ΔYI (159 hours) |
|---|---|---|
| 9 | Cyanoacrylate UVA | 6.5 |
| 10 | Hydroxybenzophenone UVA | 7.2 |
| 11 | Benzotriazole UVA | 3.3 |
| 12 | Cyanoacrylate UVA + HALS | 3.5 |
| 13 | Hydroxybenzophenone UVA + HALS | 2.9 |
| 14 | Benzotriazole UVA + HALS | 2.4 |
| 15 | HALS | 19.1 |
| 16 | None | 18.3 |

The data shown in Tables I and II show that surface impregnation by a hindered amine light stabilizer alone provides no substantial protection against photoyellowing of ABS or polystyrene during exposure to RS sunlamps. The ultraviolet radiation absorbers alone provide some protection against photoyellowing. The combination of the amine and the absorber provides a substantial improvement in resistance of photoyellowing.

EXAMPLE 17

A stabilizer composition was prepared according to the following formula:

| Ingredient | Parts by Weight |
|---|---|
| 2-hydroxy-4-octyloxy-benzophenone | 150 |
| 2-hydroxy-4-dodecyl-oxybenzophenone | 75 |
| bis(1,2,2,6,6-pentamethyl-4-piperidinyl)sebacate | 18 |
| bis(2,2,6,6-pentamethyl-4-piperidinyl)sebacate) | 18 |
| isopropanol | 2800 |

The above stabilizer composition was sprayed onto a hot extrudate of a polyphenylene ether polystyrene blend about six inches from the extrusion die. A 1×3½ inch sample was cut from the extrudate and aged in air outdoors under glass. Along with an unstabilized control yellowness index of both samples was measured monthly. The results are tabulated below.

| Month | Test Sample | Control |
|---|---|---|
| 0 | 17.4 | 17.4 |
| 1 | 16.0 | 37.6 |
| 2 | 16.6 | 45.0 |
| 3 | 17.2 | 44.3 |
| 4 | 17.3 | 38.1 |
| 5 | 17.2 | 37.5 |
| 6 | 17.3 | 40.0 |

Representative hindered amines compounds (HALS) and ultraviolet radiation absorber compounds (UVA) were selected and formulated into stabilizer compositions, as more fully described below. The compositions were flow coated onto molded plaque, 2.5×2.5×0.125 inches, of a commercial polyphenylene oxide polystyrene resin. (NORYL®)-190, General Electric Company.

The coated pieces were vertically drained for one minute and then heated in a vented oven at 105° C. for 10 minutes. The pieces were cooled to room temperature and washed with isopropanol to remove any residual stabilizers from the surface.

The samples and controls were then subjected to an accelerated light aging test. The samples were placed on a rotating table ten inches below an array of General Electric RS sunlamps. The yellowing index (YI) of the samples was recorded and thereafter periodically measured on a Gardner XL-20 tristimulus colorimeter. The rate of photoaging (ΔYI) was determined and the results are summarized in Table III below.

TABLE III

Changes in Yellowness Indices, (YI), During Exposure to RS Sunlamps of Surface Stabilized Noryl Molded Plaques

| Noryl N-190 Impregnated with | Initial YI | ΔYI After Hours RS Sunlamp Exposure | | | | | | | | | |
|---|---|---|---|---|---|---|---|---|---|---|---|
| | | 0.5 | 4 | 24 | 48 | 72 | 96 | 120 | 144 | 168 | 240 |
| 10% DOBP in Acetone | 18.6 | | −0.7 | 1.2 | | 3.0 | 5.6 | 7.6 | 9.9 | 18.0 | |
| 10% Cyasorb* UV-531 + 1% Tinuvin** 770 in Butyl Cellosolve | 22.2 | | | | | 3.8 | 12.1 | | | | |
| 10% DOBP + 1% Tinuvin 144 in Acetone | 18.5 | | | | | −0.3 | 0.6 | 1.5 | 3.3 | 5.3 | 14.5 |
| 10% Uvinul*** N-539 in Acetone | 18.2 | | | | | 3.5 | 7.3 | 16.5 | 24.1 | 31.3 | 46.9 |
| 10% Uvinul N-649 + 1% Tinuvin 144 in Acetone | 18.5 | | | | | 0.2 | 2.6 | 5.1 | 9.9 | 17.7 | 35.9 |
| 10% Cyasorb 5411 in Acetone | 18.1 | | | | | −0.6 | 0.7 | 2.4 | 5.8 | 10.2 | 18.7 |
| 10% Cyasorb 5411 and 1% Tinuvin 144 in Acetone | 18.3 | | | | | −0.8 | −0.1 | 0.5 | 2.0 | 3.9 | 10.2 |

TABLE III-continued

| | Changes in Yellowness Indices, (YI), During Exposure to RS Sunlamps of Surface Stabilized Noryl Molded Plaques | | | | | | | | | | |
|---|---|---|---|---|---|---|---|---|---|---|---|
| Noryl N-190 | Initial | ΔYI After Hours RS Sunlamp Exposure | | | | | | | | | |
| Impregnated with | YI | 0.5 | 4 | 24 | 48 | 72 | 96 | 120 | 144 | 168 | 240 |
| 1% Tinuvin 144 in Acetone | 20.2 | | | 12.8 | | | 38.6 | | | | |
| Unstabilized Noryl N-190 | 18.1 | 1.6 | 9.9 | 41.0 | | | 64.1 | | | | |

Cyasorb is a registered trademark of American Cyanamide Co.
**Tinuvin is a registered trademark of Ciba Geigy
***Uvinul is a registered trademark of G.A.F. Corp.

The selected active ingredients are listed below with identifying numerals and letters and the percent by weight of each ingredient and solvent used are set forth in Table III.

HALS

Tinuvin-770: bis(2,2,6,6-tetramethyl-4-piperidinyl)sebacate

Tinuvin-765: bis(1,2,2,6,6-pentamethyl-4-piperidinyl)-sebacate

Tinuvin-144: bis(1,2,2,6,6-pentamethyl-4-piperidinyl)-2-n-butyl-2-(3,5-di-t-butyl-4-hydroxyphenyl)methyl malonate.

UVA

DOBP: 2-hydroxy-4-dodecyloxybenzophenone
Cyasorb-531: 2-hydroxy-4-octyloxybenzophenone
Cyasorb-5411: 2-(2-hydroxy-5-t-octylphenyl)-benzotriazole
Univul-N539: 2-ethylhexyl-2-cyano-3,3-diphenylacrylate The ultraviolet radiation stabilizer compositions of this invention as applied to the surface of the article to be treated include at least one benign liquid carrier for the stabilizer compounds. The term benign means a liquid carrier which is inert towards the resin being treated and does not attack, react with, or otherwise deleteriously affect the resin.

The stabilizer composition may be in the form of a solution of the active ingredients dissolved in the liquid ingredients suspended or dispersed in the carrier or part solution-part dispersion. The particular form of the composition depends on the relative solubilities of the active ingredients in the carrier.

The composition however contains an effective amount of each of the two types of active ingredient, i.e., the ultraviolet radiation absorber and the amine stabilizer. The term effective amount means an amount necessary to substantially increase resistance to photo induced degradation. The actual amount of active ingredients will depend on the particular resin, the use for which the article is intended and the coating means employed. In general, the stabilizer composition contains from about 0.01 to about 20 weight percent of at least one of each of active ingredients and preferably from about 1 to about 12 weight percent.

Combinations of ultraviolet radiation absorbers and amine co-stabilizers which have been found to be particularly effective by reason of a synergistic effect include 2-hydroxy-4-octyloxybenzophenone, 2-hydroxy-4-dodecyloxybenzophenone, bis(2,2,6,6-tetramethyl-4-piperidinyl)sebacate, and bis(1,2,2,6,6-pentamethyl-4-piperidinyl)sebacate in isopropanol.

The preferred solvents for both application techniques are acetone and isopropanol.

In general, the process or method by which resistance to ultraviolet radiation induced degradation is improved according to this invention comprises application of the herein disclosed stabilizer compositions to a resin surface at a temperature which is high enough to permit the stabilizers to impregnate the surface layers of the article but below the temperature at which the physical properties of the resin are adversely effected. In general, the upper temperature limit should not exceed the heat distortion temperature of the resin composition and the lower temperature should be above about 60° C., preferably above about 70° C. This technique can be referred to as hot surface application and includes the same mechanical techniques by which the stabilizer composition is applied to a surface which is subsequently heated to the effective temperature, i.e., at which diffusion or impregnation takes place at a substantial rate, and procedures in which the stabilizer composition is applied to a surface already at the effective temperature. However, since the hot application technique is generally intended to be integrated with a forming operation the actual temperature may, as previously mentioned, far exceed the heat distortion temperature of the resin.

Although it is preferred to formulate the stabilizer composition of this invention as a single formulation containing the ultraviolet radiation absorber, the amine co-stabilizer and any other ingredients, it may be expedient for operational reasons to apply the stabilizers separately, as for example via separate spray nozzles arranged along an extruder line. In such situations, the separate formulations each containing one or more but not all active ingredients can be applied and if desirable dried prior to application of the other formulation. Drying between applications is not essential and the formulations can be admixed on the article surface.

The ultraviolet radiation stabilized aerticles produced in accordance with this invention are articles comprising one or more of the designated resin systems, i.e., ABS, polystyrene, and polyphenylene ether resins, characterized by a surface layer which comprises at least one of each of the stabilizer types disclosed, i.e., at least one ultraviolet radiation absorber an at least one of the hindered amine light stabilizers, hereinbefore often referred to as the co-stabilizer. Therefore an important aspect of the invention is the stabilized article per se. Such articles can be viewed as a mass of resin of some definite shape or form having impregnated within the surface layer, an ultraviolet radiation stabilizing amount of an ultraviolet radiation absorbing compound and a hindered amine light stabilizing compound as described herein. The actual amount of each compound which is located in the surface layer and the depth to which they penetrate is not narrowly critical and will depend on the particular resin and the application or use to which the article will be put. More severe or intense exposure conditions requires more stabilizer concentration. The actual amounts of active stabilizers can be easily determined by standard tests.

What I claim as new and desire to obtain by Letters Patent of the United States is:

1. A method for imparting improved ultraviolet radiation stability to an article comprising a member selected from the group of resins consisting of polystyrene resins, acrylonitrile-butadiene-styrene resins, and polyphenylene ether resins which comprises contacting the surface of the article with a stabilizer composition comprising a hindered amine light stabilizer and ultraviolet radiation absorber compound in nonaggressive liquid carrier at a temperature sufficient to effectively impregnate the surface of the article with the hindered amine light stabilizer and the ultraviolet radiation absorber.

2. The method of claim 1 wherein the temperature is between about 60° C. and the glass transition temperature of the resin.

3. The process of claim 2 wherein the hindered amine light stabilizer is selected from the group consisting of 2-hydroxy-4-dodecylbenzophenone and 2-hydroxy-4-octyloxybenzophenone; the ultraviolet radiation absorber is selected from the group consisting of bis(2,2,6,6-tetramethyl-4-piperidinyl)sebacate and bis(1,2,2,6,6-pentamethyl-4-piperidinyl)sebacate.

4. The process of claim 3 wherein the nonaggressive liquid carrier is selected from the group consisting of hydroxy-ethers, alcohols, mixtures of water and alcohols, liquid aliphatic hydrocarbons, liquid cycloaliphatic hydrocarbons, and chlorofluorocarbons.

5. The method of claim 4 wherein the nonaggressive liquid carrier is selected from the group consisting of acetone and isopropanol.

* * * * *